US005729928A

United States Patent [19]
Anderson

[11] Patent Number: 5,729,928
[45] Date of Patent: Mar. 24, 1998

[54] BAIT FLUID DISPENSING APPARATUS AND METHOD FOR CRAB TRAPS

[75] Inventor: Ronald A. Anderson, 4514 SW. Trenton, Seattle, Wash. 98136

[73] Assignees: Ronald A. Anderson, Seattle; Matthew P. Veeder, Stanwood, both of Wash.

[21] Appl. No.: 603,857

[22] Filed: Feb. 22, 1996

[51] Int. Cl.⁶ ............................................ A01K 97/02
[52] U.S. Cl. .................................... 43/44.99; 239/56
[58] Field of Search .......................... 43/44.99, 100, 43/102, 42.06, 41; 239/49, 50, 53, 56, 51.5; 119/210, 212, 230, 242

[56] References Cited

U.S. PATENT DOCUMENTS

| | | | |
|---|---|---|---|
| 2,609,230 | 9/1952 | Raleigh | 239/47 |
| 2,791,058 | 5/1957 | Bettini | 43/42.06 |
| 3,835,572 | 9/1974 | Mounsey | 43/42.06 |
| 4,138,794 | 2/1979 | Chiodini | 43/44.99 |
| 4,194,690 | 3/1980 | Stever et al. | 43/131 |
| 4,788,788 | 12/1988 | Brockett | 43/44.99 |
| 4,969,599 | 11/1990 | Campbell | 239/51.5 |
| 5,307,584 | 5/1994 | Jarvis | 43/1 |

FOREIGN PATENT DOCUMENTS

| | | | |
|---|---|---|---|
| 1366951 | 12/1964 | France | 43/44.99 |
| 2579071 | 9/1986 | France | 43/4 |
| 2132862 | 7/1984 | United Kingdom | 43/1 |
| 2226743 | 7/1990 | United Kingdom | 43/44.99 |

*Primary Examiner*—Joseph J. Hail, III
*Attorney, Agent, or Firm*—Ronald M. Anderson

[57] ABSTRACT

An apparatus and method for dispensing bait fluid such as fish oil at a substantially uniform rate into water surrounding a trap to attract crustaceans such as crabs or shrimp. The apparatus includes a cylindrical housing (108) closed with end caps (106, 114), to store the bait fluid, and a normally open port for filling the housing with the bait fluid. A plurality of orifices (112) are formed in the lower end cap (114) for dispensing the bait fluid into the water surrounding a crab trap. Additionally, the apparatus may include a flow restrictor (116) for controlling the flow rate of the bait fluid through the orifices. A positioner (110) is provided for fixing the flow rate restrictor in place inside the dispenser housing. One of the end caps (106) is removable for providing access to the interior of the housing. A normally closed valve (102) may be included for releasing trapped air during the filling of the dispenser housing with bait fluid.

15 Claims, 3 Drawing Sheets

BAIT FLUID DISPENSING APPARATUS AND METHOD FOR CRAB TRAPS

FIELD OF THE INVENTION

This invention relates to the field of baiting crab traps. More particularly, the invention relates to an apparatus and method for effectively and efficiently baiting crab traps by dispersing fish oil into the water in which the crab traps are submerged.

BACKGROUND OF THE INVENTION

Crabs live on the bottom of the ocean in a world of constant twilight. The poor lighting conditions force crabs to rely upon their olfactory sense of smell rather than their sense of sight to find food. One source of food for crabs is dead fish. When fish die, they release an oil that crabs can smell. Crabs use this smell to locate dead fish on the bottom of the ocean so that they can feed on the decaying fish.

It is well known in the crabbing industry that the smell of decaying fish attracts crabs and can be used to bait traps for crabs. The trade name for a trap designed to catch crabs is a crab pot. Crab pots are baited with pieces of fish such as cod that have a high oil content and are then placed on the bottom of the ocean. An attached float line enables the crab pots to be located and retrieved to remove the catch and rebait the trap. Unfortunately, the smell of the decaying fish in the submerged crab pots quickly decreases over time. The temperature of the water, rate of flow of the water over the crab pots due to currents and tidal movement, and the oil content of the fish pieces affect the efficiency and effectiveness of the fish pieces to lure crabs into the pots. Crabbing fishermen must frequently check the crab pots and replace the fish pieces to insure the effectiveness of the bait. It is apparent that there is a long felt need by the crabbing industry for an apparatus or method to improve the efficacy of bait used in crab pots.

SUMMARY OF THE INVENTION

The invention, described in detail below, is an apparatus and method for dispensing a uniform amount of bait fluid such as fish oil into a crab pot over time. The invention provides for a substantially consistent dispersion of a bait smell in a crab pot by using pure fish oil rather than fish pieces as the olfactory agent. The dispensing apparatus and method provide for restricting the flow of bait fluid from a reservoir chamber into the water, ensuring a substantially uniform release of the bait fluid into the water in which the crab pot is submerged. Therefore, crabbing fishermen that use this invention will significantly reduce the amount of effort spent monitoring and replacing bait in crab pots and should note an increased catch.

The apparatus for dispensing bait fluid to attract crabs into traps includes a housing having three components. The first component is a chamber or a reservoir for storing bait fluid. The chamber is sufficiently large to ensure a constant source of bait fluid to dispense into the water over an extended period of time. A normally closed port for filling the chamber with bait fluid is fitted to the apparatus. A user of the invention will need to periodically replenish the supply of bait fluid in the chamber through this port. The third component is an orifice for dispensing bait fluid into the crab trap. There can be more than one orifice, each of which is in fluid communication with the chamber to maintain a constant flow of bait fluid.

The apparatus may have one or more additional components, including an air relief port in the housing for releasing air trapped in the chamber when the bait fluid is added to the chamber, a flow restrictor disposed in the fluid path between the chamber and the one or more orifices to control or limit the flow of bait fluid from the chamber, and a positioner to fix the location of the flow restrictor inside the housing. Preferably, a section of the housing is removable to provide access to the interior of the chamber.

The inventive method for dispensing bait fluid to attract crabs into traps comprises at least two steps. First, a chamber is filled with a reservoir of bait fluid. Second, the bait fluid is dispensed at a substantially uniform rate of flow into the water surrounding the trap. Additionally, the method may include the step of releasing air trapped in the chamber when the bait fluid is added to the chamber.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
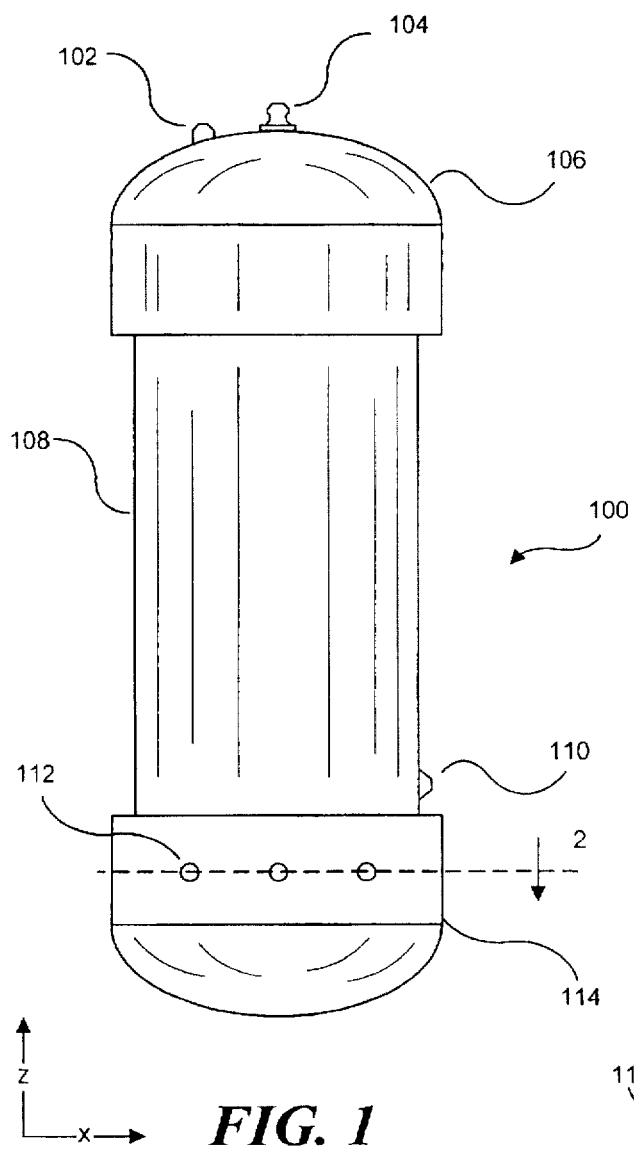
FIG. 1 is an elevational view of the bait fluid dispenser.

Referring now in particular to the accompanying drawings, a bait fluid dispenser constituting the present invention is generally indicated by a reference numeral 100. Referring to FIG. 1, dispenser 100 comprises a cylindrical housing 108, which is closed at opposite ends by an end cap 106 and an end cap 114. The cylindrical housing and ends caps are polyvinyl chloride plastic in the preferred embodiment. End cap 106 is provided with a normally closed port 104 for filling dispenser 100 with a bait fluid 120 (shown in FIG. 3). Preferably, the bait fluid comprises fish oil, e.g., cod oil. End cap 106 may also be provided with a normally closed valve 102 that is rotated to an open position to relieve air pressure during the filling of dispenser 100. In end cap 114 are formed a plurality of spaced apart, normally open orifices 112 for dispensing bait fluid into water surrounding dispenser 100. Alternatively, the orifices may be formed in the wall of cylindrical housing 108. A positioner 110 for a flow rate restrictor 116 (shown in FIG. 2) may optionally be located in cylindrical housing 108 adjacent to or inside of end cap 114. Positioner 110 is designed to hold flow rate restrictor 116 at this fixed position inside dispenser 100, preventing the flow rate restrictor from moving longitudinally inside cylindrical housing 108.

Figure 2:
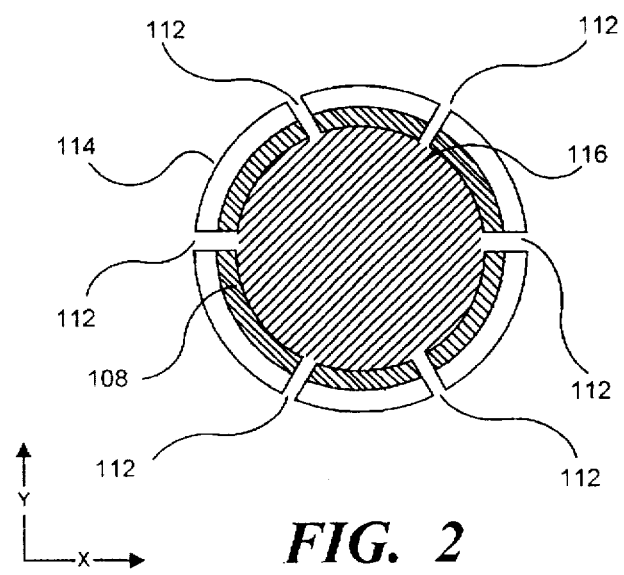
FIG. 2 is a cross-sectional view of the bait fluid dispenser.

Referring to FIG. 2, dispenser 100 is shown in cross-sectional relief at orifices 112. As indicated, the interior aperture of each orifice 112 is disposed adjacent flow rate restrictor 116. Flow rate restrictor 116 is an open cell, porous material that prevents free flow of bait fluid into the water surrounding dispenser 100 through orifices 112. The rate of flow of bait fluid from orifices 112 is directly proportional to the porosity of the semi-permeable material that comprises restrictor 116. In the preferred embodiment of dispenser 100, flow restrictor 116 comprises a woven cotton pad. However, the material comprising flow rate restrictor 116 is not restricted to a specific material; rather, the salient characteristic of the flow restrictor is the porosity of the substance used. The porosity should be sufficient to ensure that the bait fluid is widely dispersed into the water surrounding the dispenser, but limit the flow rate so that the flow of the bait fluid does not empty the dispenser prior to expiration of the time intervals at which the catch is recovered.

Figure 3:
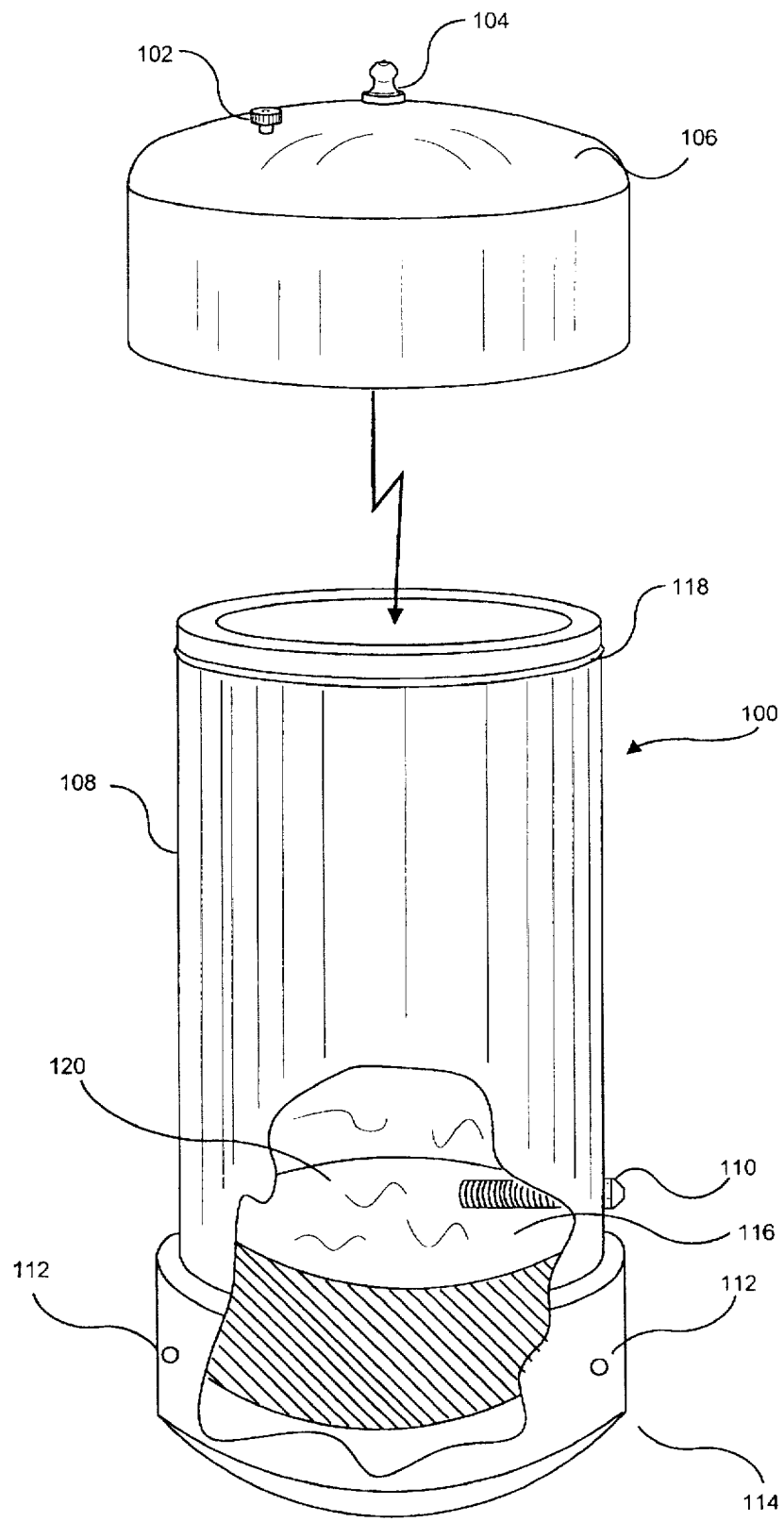
FIG. 3 is an exploded view of the bait fluid dispenser.

Referring now to FIG. 3, the interior of dispenser 100 is accessible by removing end cap 106. A gasket 118 is disposed between end cap 106 and cylindrical housing 108. Gasket 118 prevents the ingress of water into the interior of dispenser 100 when end cap 106 is seated over cylindrical housing 108. Gasket 118 is an O-ring type rubber gasket in the preferred embodiment. Alternatively, the interior of dispenser 100 might be accessed by the removal of end cap 114. If end cap 114 is also removable, then a gasket 118 should similarly be disposed between end cap 114 and cylindrical housing 108. Access to the interior of dispenser 100 may be necessary to replace restrictor 116, remove positioner 110, clean the interior surfaces of the dispenser, and for other maintenance tasks.

Positioner 110 protrudes into the interior of cylindrical housing 108 to hold restrictor 116 in place. Alternatively, positioner 110 could be formed as a ridge or extrusion suitable for holding restrictor 116 in place. Various types of salt-water resistant fasteners can also be used for this purpose.

Figure 4:
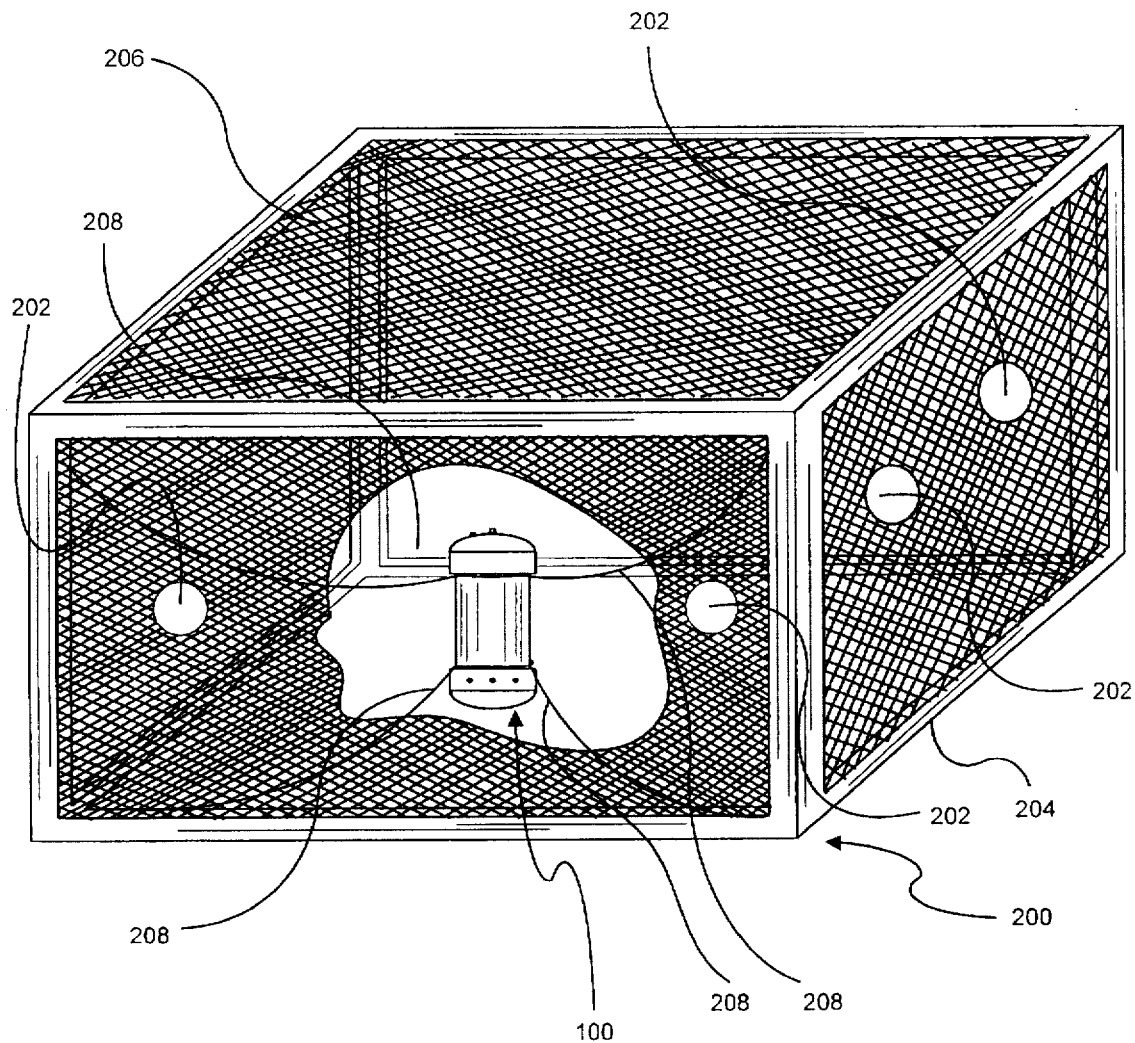
FIG. 4 is a perspective view showing the bait fluid dispenser located within a crab trap.

Referring to FIG. 4, a trap for catching crabs is generally indicated by reference numeral 200. Crab trap 200 comprises a frame 204, with netting 206 stretched across it to form an enclosure. Netting 206 includes openings 202 on the sides of crab trap 200 through which crabs enter the trap. Bait fluid dispenser 100 is shown suspended inside crab trap 200; positioning cables 208 are used to hold the bait fluid dispenser in an upright position. The crabs are lured into crab trap 200 by the smell of the bait fluid diffusing into the water in which the crab trap is disposed. The continuous olfactory stimulation provided by dispenser 100 lures the crabs into trap 200 through one of the openings 202. The crabs remain inside crab trap 200 until a fisherman retrieves the crab trap and extracts them.

Alternative housings for dispenser 100 having non-cylindrical shapes can store and release bait fluid in substantially the same manner as the cylindrical housing shown in the accompanying drawings. For example, housings that are square or rhomboid-shaped would retain the same functionality as the cylindrical housing of the preferred embodiment.

It is also contemplated that control of the flow rate of bait fluid through each orifice 112 can be achieved without using any added restrictive devices. Each orifice 112 can be sized to a smaller diameter to control the flow rate of the bait fluid rather than using restrictor 116 inside the interior of dispenser 100 to limit the flow.

In the preferred embodiment, dispenser 100 is filled with pure fish oil through normally closed port 104, which is a ball check valve Zerk fitting of the type normally used for adding grease to bearings on machinery. Alternatively, normally closed port 104 may comprise a compression plug, a screw-in seal, and/or other type of one-way check valve. While not shown in the drawings, a hose connected to a barrel or tank of bait fluid on a crab boat would likely be used to fill dispenser 100. There is an advantage to providing a protected storage facility for the bait fluid. First, cold temperatures adversely affect the viscosity of bait fluid and can slow the filling of dispenser 100 with bait fluid. In cold climates, a fisherman can store the bait fluid in a temperature controlled environment below the deck of a crab boat, so that the viscosity necessary for filling is maintained.

Financial considerations or equipment constraints could prevent a fisherman from using pure fish oil as the bait fluid. The cost of pure fish oil might be economically unfeasible for a smaller fishing venture. Fortunately, the present invention can be used with alternative lower cost types of bait fluid. For example, alternative bait fluids might comprise fish pieces mixed with fish oil or fish pieces crushed into a mash. The viscosity of such a mixture or mash could preclude filling dispenser 100 through normally closed port 104. If the viscosity of a mixture or mash prevented a fisherman from filling dispenser 100 through normally closed port 104, end cap 106 or end cap 114 could be removed to enable filling the interior of dispenser 100 with the mixture or mash.

It will be apparent that the present invention is also usable by fishermen who trap crustaceans other than crabs, such as shrimp or lobsters. These fishermen might find it necessary to prepare specific recipes for bait fluid that are tailored for the particular olfactory senses or feeding habits of their intended catch. These tailored recipes of bait fluid could be used to lure particular species of crustaceans into a trap with dispenser 100. The present invention is easily adaptable to catching particular species of crustaceans with different formulations of bait fluid. It is also contemplated that the present invention can readily be adapted for use in non-commercial crustacean traps. For recreational users, it is likely that the size and shape of dispenser 100 would be changed. However, the method used to dispense the bait fluid would be as disclosed above.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. An apparatus that dispenses a bait fluid into a surrounding body of water for attracting crustaceans into a trap, comprising:
   (a) a housing defining a chamber for containing the bait fluid;
   (b) a normally closed port disposed on the housing, in fluid communication with the chamber, said port being opened for filling the chamber with the bait fluid;
   (c) at least one orifice disposed in the housing, for dispensing bait fluid; and
   (d) a porous flow restrictor pad disposed within the chamber and covering said at least one orifice, for limiting a flow of the bait fluid through said at least one orifice into the surrounding body of water, so that a substantially uniform flow of bait fluid is released into the surrounding body of water to attract the crustaceans into the trap.

2. The apparatus of claim 1, further comprising an air relief port disposed on the housing for releasing air trapped in the chamber when bait fluid is added to the chamber.

3. The apparatus of claim 1, wherein the porous flow restrictor pad is disposed in a fluid path between the bait fluid and said at least one orifice and has a porosity selected to limit the flow rate of the bait fluid from the chamber through said at least one orifice sufficiently to ensure that the chamber is not emptied of bait fluid in less than a defined interval of time.

4. The apparatus of claim 1, further comprising a positioner to fix the location of the porous flow restrictor pad inside the housing.

5. The apparatus of claim 1, wherein the housing further comprises at least one removable section, which when removed, provides access to the chamber.

6. The apparatus of claim 5, wherein said at least one removable section is fitted to a portion of the housing, further comprising a sealing gasket disposed between each removable section and the portion of the housing for inhibiting the ingress of water into the bait fluid dispenser between said at least one removable section and said portion of the housing.

7. The apparatus of claim 1, wherein the housing comprises a cylindrical tube having caps sealingly fitted to each end.

8. A bait fluid dispenser for dispensing a bait fluid into a body of water into which the bait fluid dispenser is submerged, comprising:

(a) a housing defining a chamber;

(b) means for releasing the bait fluid from the chamber into the body of water surrounding the housing at a predefined controlled rate, said means comprise at least one orifice extending through the housing into the chamber, and a bait fluid flow rate restrictor that includes a pad disposed within the chamber adjacent to the orifice; and (c) means for filling the chamber with the bait fluid, said means enabling the bait fluid to flow into the chamber, but not out of the chamber.

9. The bait fluid dispenser of claim 8, wherein the bait fluid flow restrictor comprises an open cell pad having a porosity selected to ensure that the chamber does not empty of the bait fluid through the pad and the orifice in less than a defined time.

10. The bait fluid dispenser of claim 8, including means for fixing a position of the pad within the chamber.

11. The bait fluid dispenser of claim 8, wherein the housing includes means for accessing an interior of the dispenser.

12. The bait fluid dispenser of claim 11, wherein the means for accessing includes a gasket for sealing to prevent the ingress of water into the chamber past the means for accessing.

13. The bait fluid dispenser of claim 8, wherein the means for releasing the bait fluid at the controlled rate comprise at least one orifice extending through the housing and sized sufficiently small to limit the flow of the bait fluid from the chamber into the body of water surrounding the housing through said at least one orifice.

14. The bait fluid dispenser of claim 8, wherein the bait fluid comprises a liquid fish oil, said means for filling including a Zerk fitting through which the liquid fish oil is pumped into the chamber.

15. The bait fluid dispenser of claim 8, further comprising means for releasing air from the chamber when the chamber is filled with the bait fluid.

\* \* \* \* \*

UNITED STATES PATENT AND TRADEMARK OFFICE
CERTIFICATE OF CORRECTION

PATENT NO. : 5,729,928
DATED : March 24, 1998
INVENTOR(S) : Ronald A. Anderson

It is certified that error appears in the above-indentified patent and that said Letters Patent is hereby corrected as shown below:

| Column | Line | |
|---|---|---|
| 5 | 4 | after "the" (first occurrence) insert --porous-- |
| 5 | 4 | after "the" (second occurrence) delete "porous" |

Signed and Sealed this

Twenty-seventh Day of October, 1998

Attest:

BRUCE LEHMAN

Attesting Officer

Commissioner of Patents and Trademarks